C. P. NALL.
GRAIN ELEVATOR AND CLEANER.
APPLICATION FILED JULY 29, 1914.
1,285,783.
Patented Nov. 26, 1918.
2 SHEETS—SHEET 1.
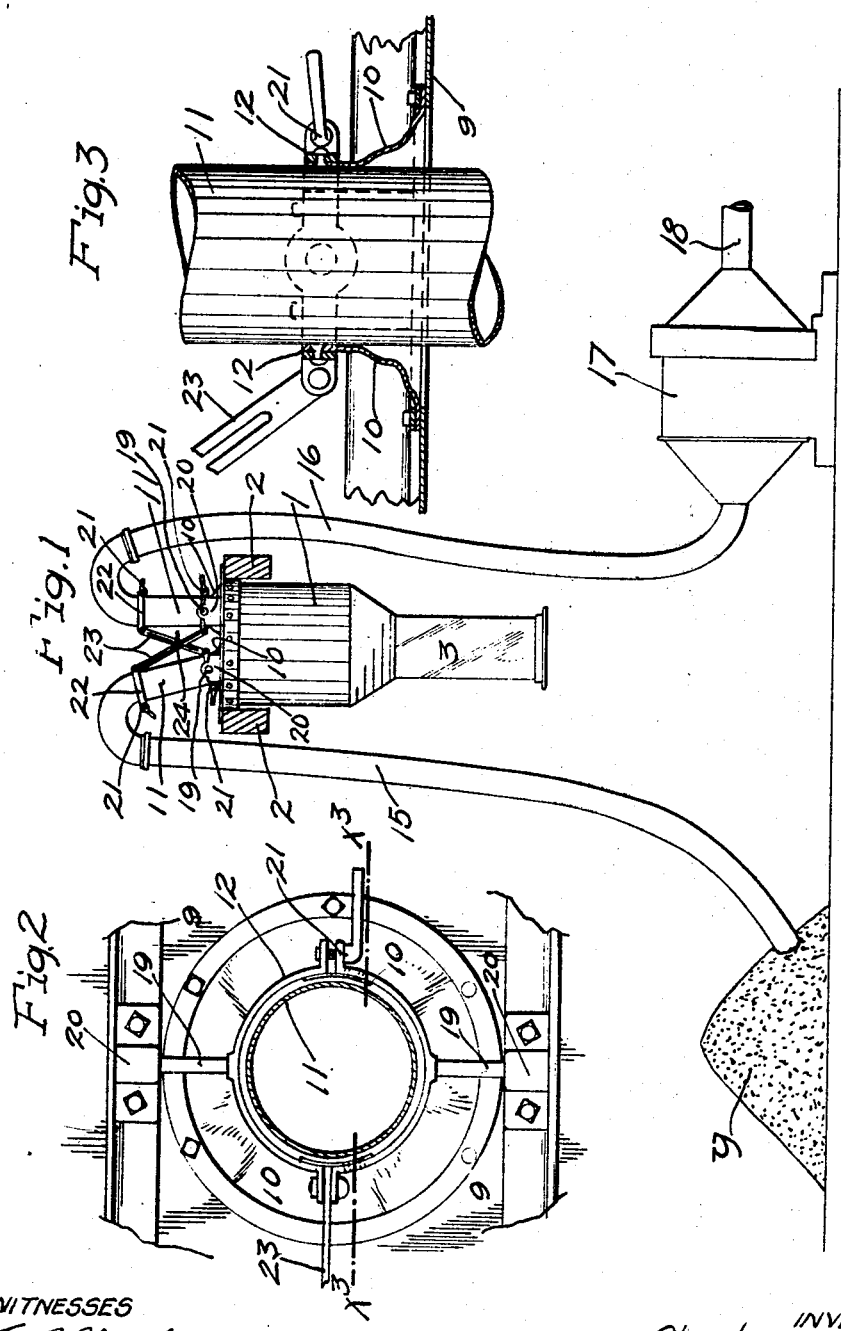
WITNESSES
E. C. Skinkle
A. H. Opsahl
INVENTOR
Charles P. Nall
BY HIS ATTORNEYS
Williamson Merchant

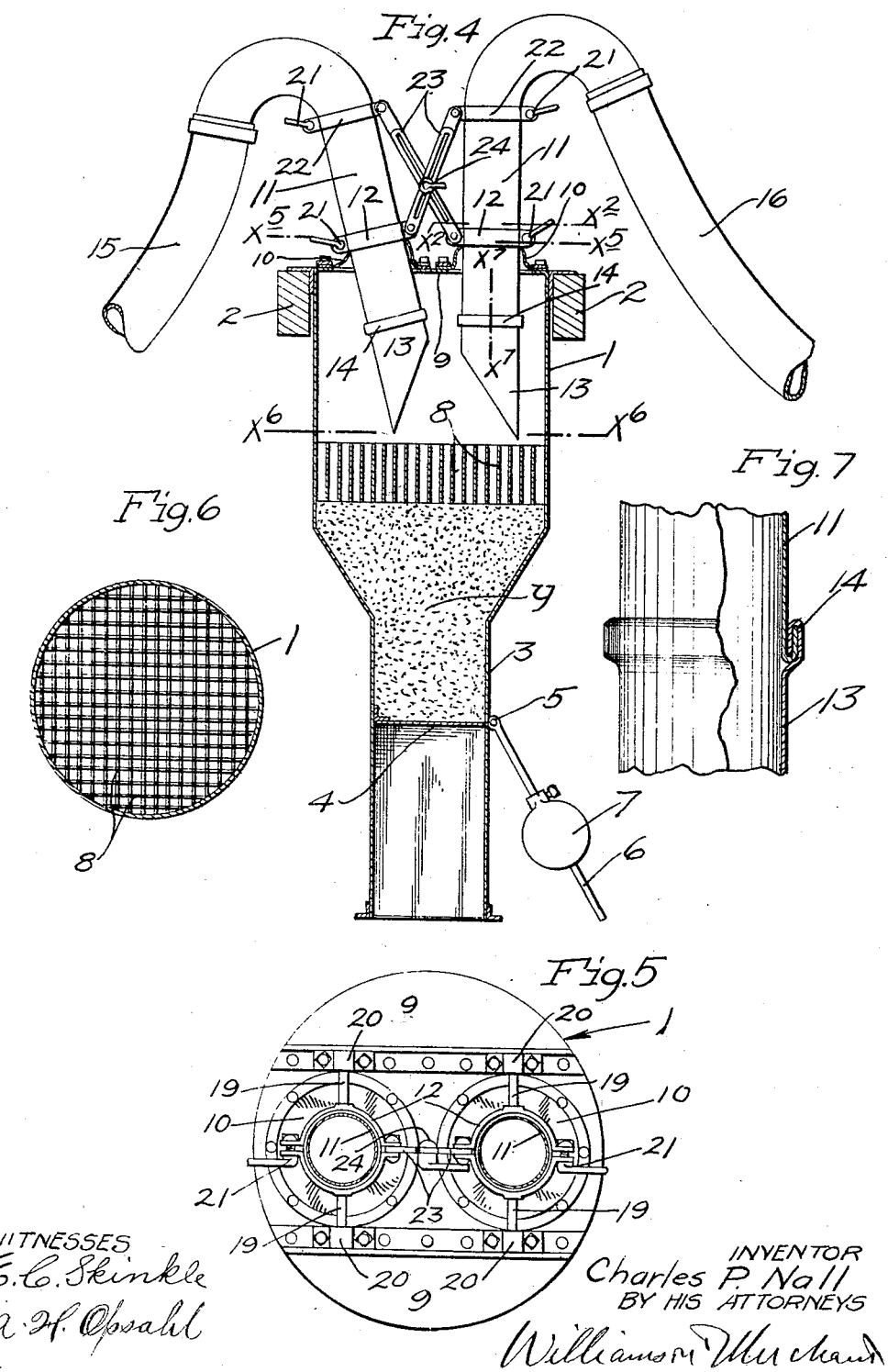

UNITED STATES PATENT OFFICE.

CHARLES P. NALL, OF MINNEAPOLIS, MINNESOTA, ASSIGNOR TO NALL SEPARATOR AND ELEVATOR COMPANY, A CORPORATION OF SOUTH DAKOTA.

GRAIN ELEVATOR AND CLEANER.

1,285,783.

Specification of Letters Patent.

Patented Nov. 26, 1918.

Application filed July 29, 1914. Serial No. 853,885.

*To all whom it may concern:*

Be it known that I, CHARLES P. NALL, a citizen of the United States, residing at Minneapolis, in the county of Hennepin and State of Minnesota, have invented certain new and useful Improvements in Grain Elevators and Cleaners; and I do hereby declare the following to be a full, clear, and exact description of the invention, such as will enable others skilled in the art to which it appertains to make and use the same.

My invention has for its object to provide a simple and highly efficient pneumatic elevator and separator especially adapted for handling grain, but also adapted for handling of various other materials capable of being transported by suction, and which it may be desired, either to elevate, or to elevate and separate into different grades or degrees of fineness, quality, or kind.

Generally stated, the invention consists of the novel devices and combination of devices hereinafter described and defined in the claims.

In the accompanying drawings which illustrate the invention, like characters indicate like parts throughout the several views.

Referring to the drawings:

Figure 1 is a side elevation with some parts sectioned, showing the improved apparatus;

Fig. 2 is an enlarged horizontal section taken on the line $x^2$ $x^2$ on Fig. 4;

Fig. 3 is a vertical section taken on the line $x^3$ $x^3$ on Fig. 2, some parts being shown in full.

Fig. 4 shows the hopper and immediately associated parts of the apparatus, partly in vertical section and partly in elevation;

Fig. 5 is a horizontal section taken approximately on the line $x^5$ $x^5$ on Fig. 4;

Fig. 6 is a horizontal section taken on the line $x^6$ $x^6$ on Fig. 4; and

Fig. 7 is a fragmentary view showing the end of one of the suction spouts partly in elevation and partly in vertical section on the line $x^7$ $x^7$ on Fig. 4.

The numeral 1 indicates a large hopper which is held in an elevated position on suitable supports 2 and is provided with a contracted depending discharge spout 3 that is preferably made rectangular in horizontal section. This spout 3 is normally closed by a gate or drop bottom 4 that is hinged to the upper spout 3 at 5 and is provided with a projecting arm 6 on which a weight 7 is adjustably mounted. Extending across the intermediate portion of the hopper 1 is a deep grate 8 made up of transversely intersecting slats, preferably constructed after the manner of the intersecting partitions of an egg crate, but preferably made up from thin sheet metal strips.

The top of the hopper 1 is closed by a top plate 9 that is provided with two flexible diaphragms 10. Through the diaphragms 10 are extended metallic tube sections 11 that are connected with tie joints to said diaphragms, preferably by clamping bands 12. The lower ends of the tube sections 11, which project into the hopper, are provided with swiveled extensions 13 shown as connected thereto, by swiveled joints formed by overlapped end flanges 14, as best shown in Fig. 7. The lower ends of the tube extensions 13 are beveled, as best shown in Fig. 4, for a purpose which will presently appear.

One of the tube sections 11 is provided with a flexible suction tube or pipe 15, the free end of which is portable, so that it may be moved about into engagement with grain or material to be picked up. The grain or material to be picked up and elevated is, in Fig. 1, shown as in a pile indicated by the character Y.

The other tube section 11 is connected by a pipe, preferably in the form of a flexible tube 16, to a suction fan or blower 17, which, as shown, discharges through the pipe 18.

In the construction illustrated, the clamping rings 12 are pivotally supported by means of trunnions 19 that project diametrically from the same and are journaled in suitable bearings 20 on the hopper head 9. Also, as shown, the said clamping rings 12 are split, and their ends are adapted to be adjustably drawn together by a threaded stem or clamping levers 21. With this arrangement, the tube sections 11 are mounted for oscillatory movements with the clamping rings 12 and are capable of vertical adjustments through the said clamping rings. I also provide means for adjustably holding the tube sections 11 in various different angular positions, in respect to each other and in respect to the axis of the hub 1. The means provided for this purpose comprises as follows:

The numeral 22 indicates the clamping rings applied to the tube sections 11 above the clamping rings 12. The inner portions of the clamping rings 12 are pivotally connected to the lower ends of slotted two-part extensible links 23, and these extensible links are transversely crossed and pivotally connected to the inner portions of upper clamping rings 22. A nut-equipped clamping bolt 24 is passed through the transversely intersecting slots of the links 23, and when tightened, secures the said links together as a truss, which serves to hold the tube sections 11 in the desired relative angular adjustment.

The operation of the apparatus described, is substantially as follows:

Under the strong suction from the fan 17, a partial vacuum will be formed in the closed hopper 1 and this partial vacuum will pick up the grain and draw the same upward through the tube 15 and connected tube 11 into the hopper. The heavy grain will be precipitated onto the grate 8 and will fall therethrough into the bottom of the hopper, while the lighter particles, such as chaff, dust, and the like will be drawn into the lower end extension 13 of the other or outlet tube 11, and will be carried through the tube 16 to the fan, and from thence it will be discharged through the fan outlet 18. The deep grate 8 cuts off cross drafts below the upper surface thereof and prevents the grain, which once strikes the grate, from being picked up and carried off through the discharge spout. The grain or material which accumulates in the hopper will fill the lower portion thereof, and effectually prevent air from being drawn upward through the hopper discharge spout 3. When the grain $Y^1$ which has accumulated in the hopper, as above stated, acquires sufficient weight, it will force open the discharge gate 4 and will pass from the hopper down through the discharge spout 3 thereof. The weight 7 may be adjusted to cause the gate to open under any desired grain pressure. The said gate is, of course, entirely automatic in its action in that it opens to permit the required discharge of grain and closes to maintain the proper accumulation of grain necessary to close the spout 3 against the passage of air upward therethrough.

The apparatus above described may be used either simply as an elevator, or as a combined elevator and separator. The amount of material drawn off through the discharge spout from the hopper will, of course, depend in the first instance, upon the suction force of the fan 17, but with the said fan working at a predetermined pressure, the amount of material drawn off and the proportioned amount of material precipitated into the hopper may be regulated by adjustments of the spouts 11 and their extensions 13, in respect to each other. For example, if the device is to be used as a grain elevator, and only for light dust to be carried off, the lower ends or extensions of said tube sections 11 should be separated as far as possible from each other, and if desirable or necessary, the swiveled extensions 13 may be rotated so that their beveled faces will be turned away from each other. When it is desired, for example, to separate wild oats and other relatively light grains or seeds from wheat, the beveled sides of the tube extensions 13 should be turned toward each other and adjusted closer together, or probably substantially, as shown in Fig. 4. The separating action may be also varied by vertical adjustments of the tubes 11 through the diaphragms 10 and clamping rings 12.

It will, of course, be understood that this apparatus may be used for elevation and separation of various materials other than grain, which materials are capable of being elevated by suction and which contain relatively light and heavy particles.

What I claim is:

1. In an apparatus of the kind described, the combination with a closed hopper, of suction tubes extending into the same, and means connected to one of said tubes for producing a partial vacuum therein, the ends of said tubes within said hopper having reversely beveled portions.

2. In an apparatus of the kind described, the combination with a closed hopper, of suction tubes extending into the same, and means connected to one of said tubes for producing a partial vacuum therein, the ends of said tubes within said hopper being swiveled and reversely beveled.

3. In an apparatus of the kind described, the combination with a closed hopper, of suction tubes extending into the same, and means connected to one of said tubes for producing a partial vacuum therein, the ends of said tubes within said hopper being adjustable in respect to each other, a deep grate extending across said hopper below the inner ends of said tubes, and the said hopper having a depending discharge spout and a yieldingly closed gate therein.

In testimony whereof I affix my signature in presence of two witnesses.

CHARLES P. NALL.

Witnesses:
F. D. MERCHANT,
HARRY D. KILGORE.